United States Patent
Crees et al.

[11] Patent Number: 6,165,410
[45] Date of Patent: Dec. 26, 2000

[54] DOWNDRAFT EXHAUST CUTTING TABLE

[75] Inventors: Craig A. Crees; Floyd C. Egdorf; Robert S. Jacobsen; Mike J. Jordan, all of Sioux City, Iowa; David R. Lindgren, South Sioux City, Nebr.; Steven A. Mathieson; Douglas G. Milner, both of Sioux City, Iowa; Larry L. Minter, Jefferson, S. Dak.; John R. Sunderman, Omaha, Nebr.

[73] Assignee: Missouri Valley Steel Company, Sioux City, Iowa

[21] Appl. No.: 09/247,729

[22] Filed: Feb. 9, 1999

[51] Int. Cl.[7] .................................................. B23K 7/08
[52] U.S. Cl. ............................................. 266/49; 266/48
[58] Field of Search ...................... 266/48, 49; 148/196

[56] References Cited

U.S. PATENT DOCUMENTS

| 3,701,514 | 10/1972 | Walters et al. | 266/49 |
|---|---|---|---|
| 3,850,086 | 11/1974 | Walters et al. | 98/115 LH |
| 4,058,299 | 11/1977 | Lindkvist | 266/48 |
| 4,441,934 | 4/1984 | Kawakami | 266/49 |
| 5,435,525 | 7/1995 | Roy et al. | 266/49 |

OTHER PUBLICATIONS

Anderson Semi–Automatic Water Tables advertisement, Undated.

*Primary Examiner*—Scott Kastler
*Attorney, Agent, or Firm*—Koley Jessen P.C., A Limited Liability Organization; Mark D. Frederiksen

[57] ABSTRACT

A downdraft exhaust cutting table comprising an elongated cutting table having a cutting torch positioned thereover and which is movable along the length thereof to cut material positioned on the cutting table. An elongated exhaust duct is positioned beneath the cutting table and runs parallel to the length of the cutting table. The exhaust duct has a plurality of horizontally spaced-apart exhaust openings formed therein which close by a movable damper. In one embodiment, successive dampers are opened as a slag collection bucket moves along the length of the cutting table below the cutting torch. In a second embodiment, a plurality of ventilation zones are created by pivotal gates extending laterally outwardly from the exhaust duct and which are pivotally movable to permit slagger to pass therethrough.

13 Claims, 6 Drawing Sheets

DOWNDRAFT EXHAUST CUTTING TABLE

BACKGROUND OF THE INVENTION

1. Field of the Invention

This invention relates generally to cutting tables, and more particularly to a downdraft exhaust cutting table in association with a slag removal system.

2. Description of the Related Art

Cutting tables are generally horizontal work tables formed of a plurality of spaced-apart slats or grids upon which a metal plate or sheet is supported while a gas cutting torch cuts out predetermined shapes. Typically, the cutting is repeated in an automatic sequence, and follows a predetermined pattern or template. The cutting operation creates a polluted environment due to the fumes and smoke created by the cutting torch system. Further, the cutting operation results in slag accumulating beneath the cutting table. In an attempt to solve the pollution problem, water cutting tables have been provided wherein the cutting operation occurs underwater. However, water cutting tables create a risk of water spotting on bright finishes and create the risk of hydrogen entrapment when aluminum is being cut. Further, the parts, skeleton, and scrap are wet and exposed to rust, with the disposal of the same being complex. Yet another disadvantage of water cutting tables is the difficulty in the disposal of the contaminated water.

SUMMARY OF THE INVENTION

The downdraft exhaust cutting table of this invention comprises an elongated, horizontally disposed, cutting table having opposite ends and opposite sides. A cutting torch assembly is positioned over the cutting table and is movable along the length thereof to cut material positioned on the cutting table. An elongated exhaust duct is positioned beneath the cutting table and runs parallel to the length of the cutting table. The exhaust duct has a plurality of horizontally spaced-apart exhaust openings formed therein. The interior of the exhaust duct is in communication with an exhaust system for exhausting air from within the exhaust duct. Normally closed movable dampers are positioned adjacent each of the openings in the duct and are movable between open and closed positions. Each of the movable dampers, when in its said open position, permits the passage of fume-laden air and smoke therethrough into the exhaust duct. One or more of the dampers below the cutting torch assembly are opened so that fume-laden air and smoke from the vicinity of the cutting table will be drawn into the exhaust duct and exhausted therefrom. In one embodiment of the invention, a slag collector is positioned beneath the cutting table below the cutting torch assembly for collecting slag which is created by the material being cut and which falls downwardly from the cutting table. The slag collector is selectively movable along the length of the cutting table so as to be positioned beneath the movable cutting torch assembly. In another embodiment, a plurality of vertically disposed and horizontally spaced gates extend laterally from the exhaust duct to one side of the cutting table beneath the cutting table to define a plurality of ventilation zones. The slag removal device is movably positioned beneath the cutting table for removing slag which is created by the material being cut and which falls downwardly from the cutting table. The gates are movably mounted so that the slag removal device may pass therethrough.

It is therefore a principal object of the invention to provide an improved downdraft exhaust cutting table.

Still another object of the invention is to provide a low maintenance downdraft exhaust cutting table.

Still another object of the invention is to provide a downdraft exhaust cutting table including an exhaust duct positioned beneath the cutting table and having a plurality of dampered openings provided along the length thereof wherein one or more of the dampered openings are opened when the cutting torch assembly is positioned thereabove to exhaust smoke and fume-laden air from the vicinity of the cutting table.

Still another object of the invention is to provide a device of the type described including a slag removal device.

Still another object of the invention is to provide a device of the type described which creates ventilation zones defined by movable gates with the gates being movable to permit a slag collection device to pass therethrough.

These and other objects will be obvious to those skilled in the art.

DESCRIPTION OF THE PREFERRED EMBODIMENT

Figure 1:
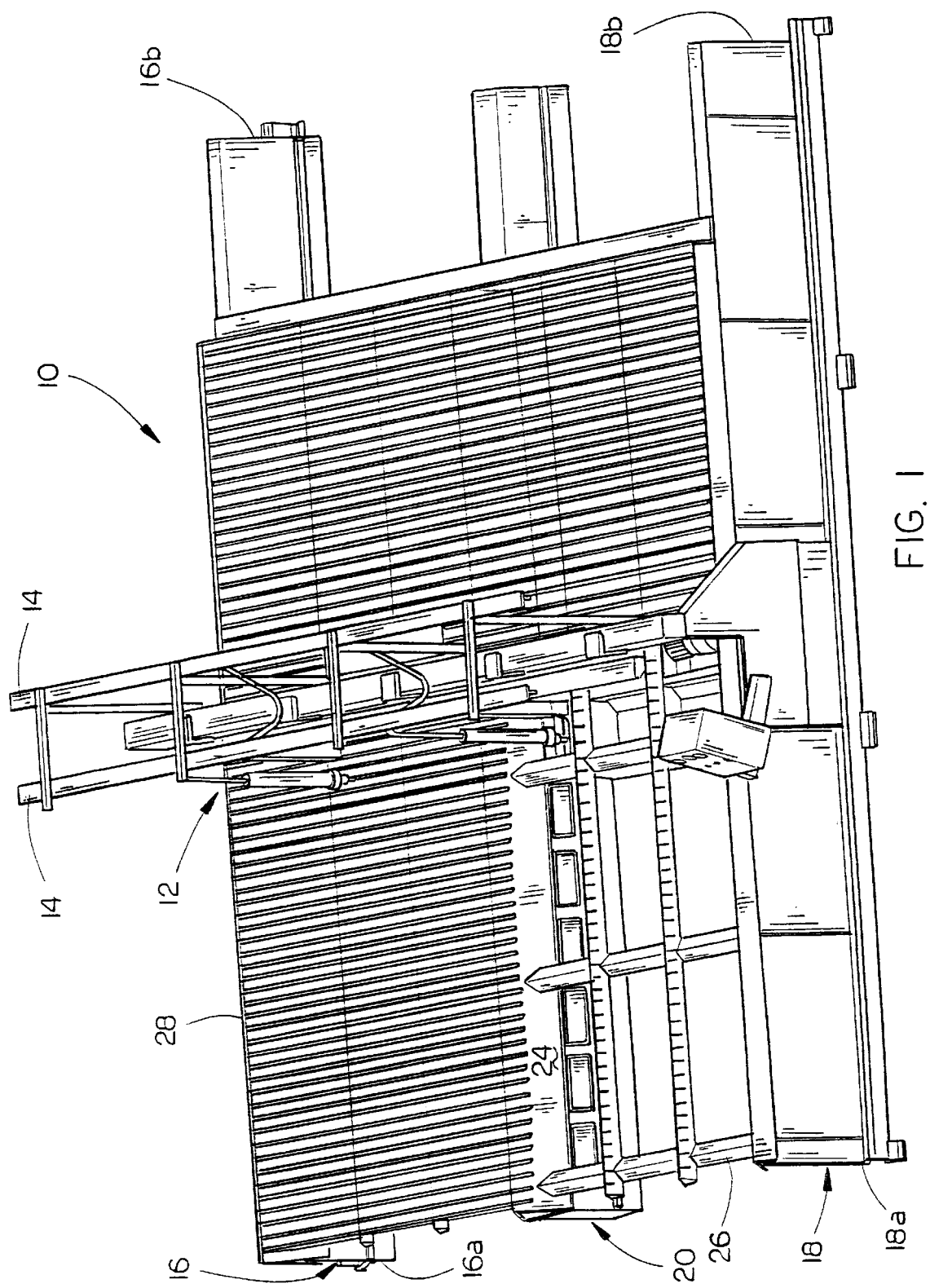
FIG. 1 is a perspective view of the cutting table of this invention.
Figure 2:
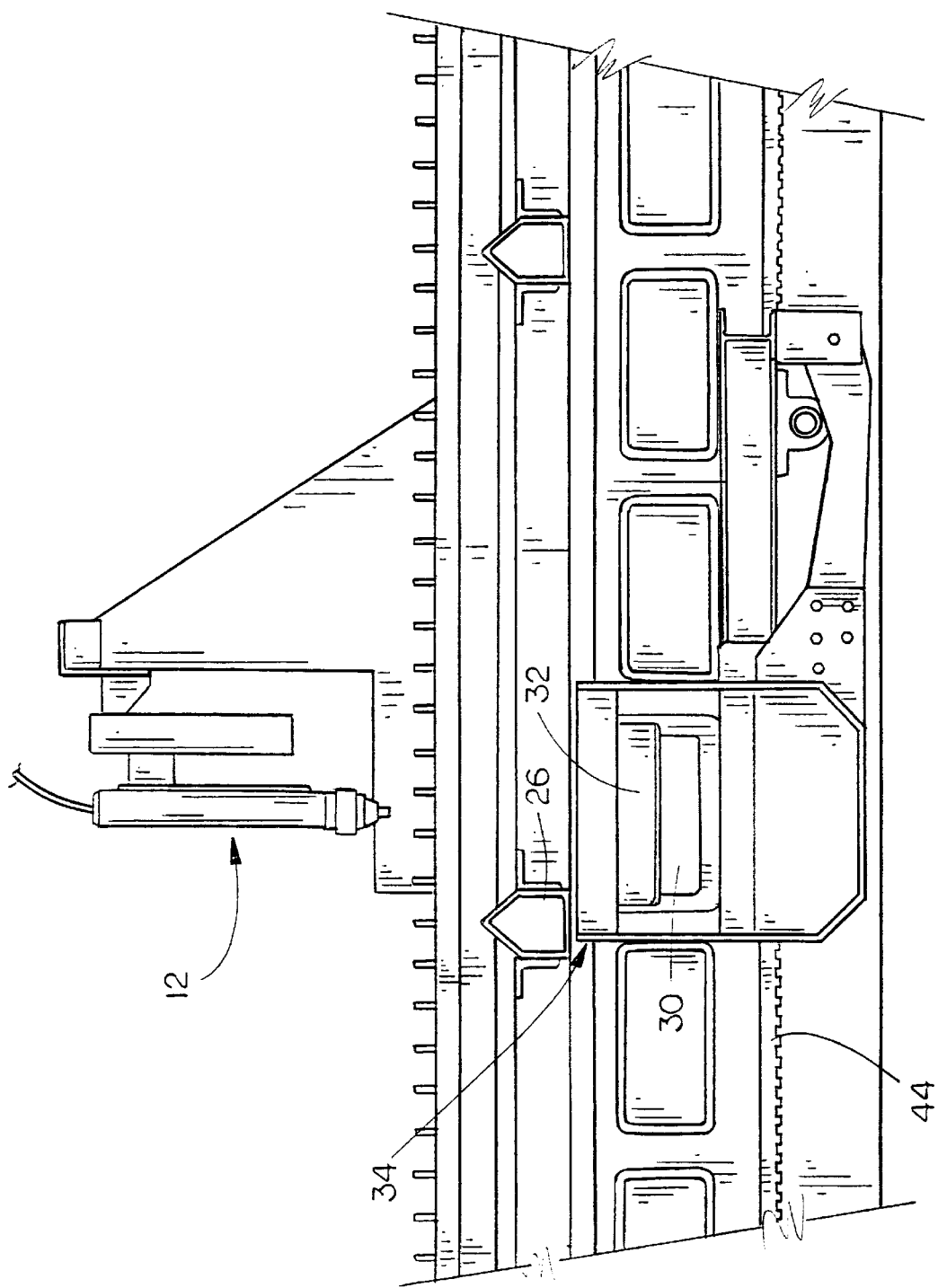
FIG. 2 is a partial side view of the cutting table.

Referring now to the drawings, in which similar or corresponding parts are identified with the same reference numeral, and more particularly to FIG. 1, the downdraft exhaust cutting table of this invention is generally designated at 10 and includes a cutting apparatus 12 of a conventional variety, supported on a pair of parallel rails 14 which extend the length of the cutting table 10. Cutting table 10 is formed from a pair or parallel vertical panels 16 and 18 extending horizontally from forward ends 16a and 18a to a rearward end 16b and 18b, respectively.

The numeral 20 refers to an elongated exhaust duct which is positioned between panels 16 and 18 and which is parallel thereto. Beam 22 is supported on exhaust duct 20 and has a deflector shield 24 positioned thereon. A plurality of horizontally spaced-apart supports 26 extend between the panels 16 and 18, as illustrated in the drawings, and support slats or grids 28 thereon upon which the metal plates to be cut are positioned.

Figure 4:
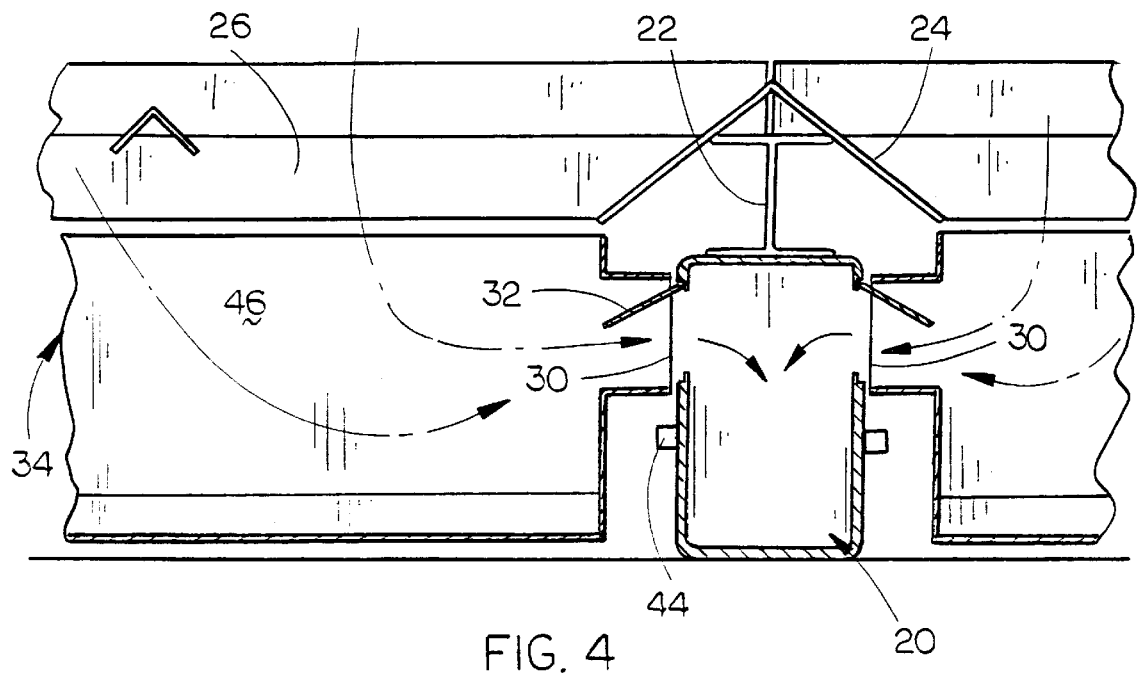
FIG. 4 is a sectional view illustrating the manner in which smoke and fume-laden air is drawn into the exhaust duct.
Figure 5:
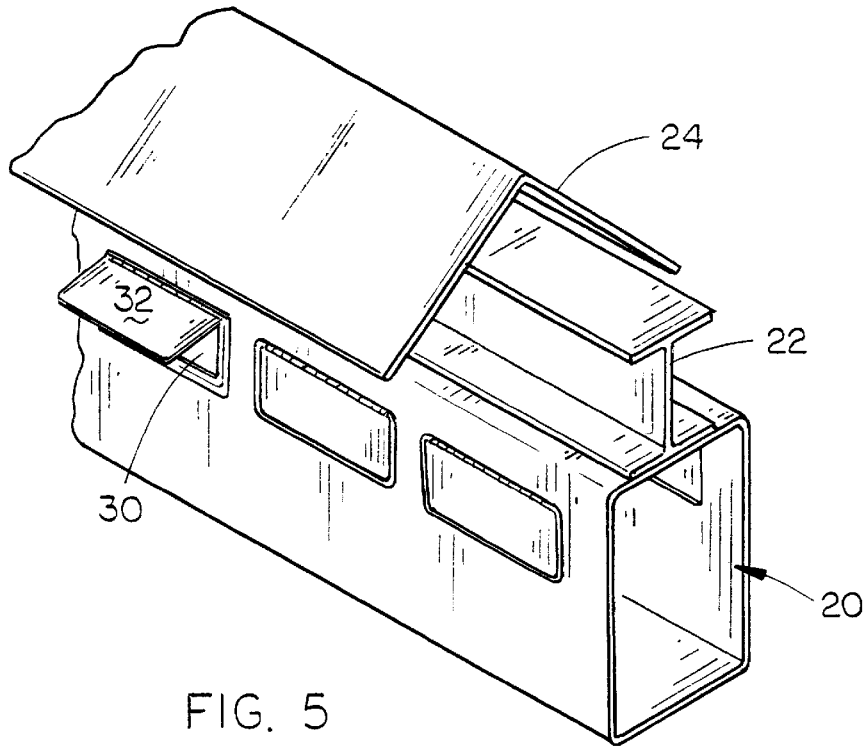
FIG. 5 is a partial perspective view of the exhaust duct.

Exhaust duct 20 is provided with a plurality of spaced-apart openings 30 formed in the opposite side walls thereof, as illustrated in FIGS. 4 and 5. Each of the openings 30 are selectively closed by a normally closed damper 32. FIGS. 4 and 5 illustrate the damper 32 being pivoted outwardly from duct 20 to permit smoke and fume-laden air to pass into the interior of duct 20. Although the drawings illustrate the dampers 32 being pivoted outwardly from the duct, the dampers 32 could also be pivotally moved inwardly into the duct 20, although that which is shown in the drawings is the preferred embodiment. The dampers 32 may be opened by any convenient means such as by cams, cylinders, etc., which do not form a part of this invention.

Figure 3:
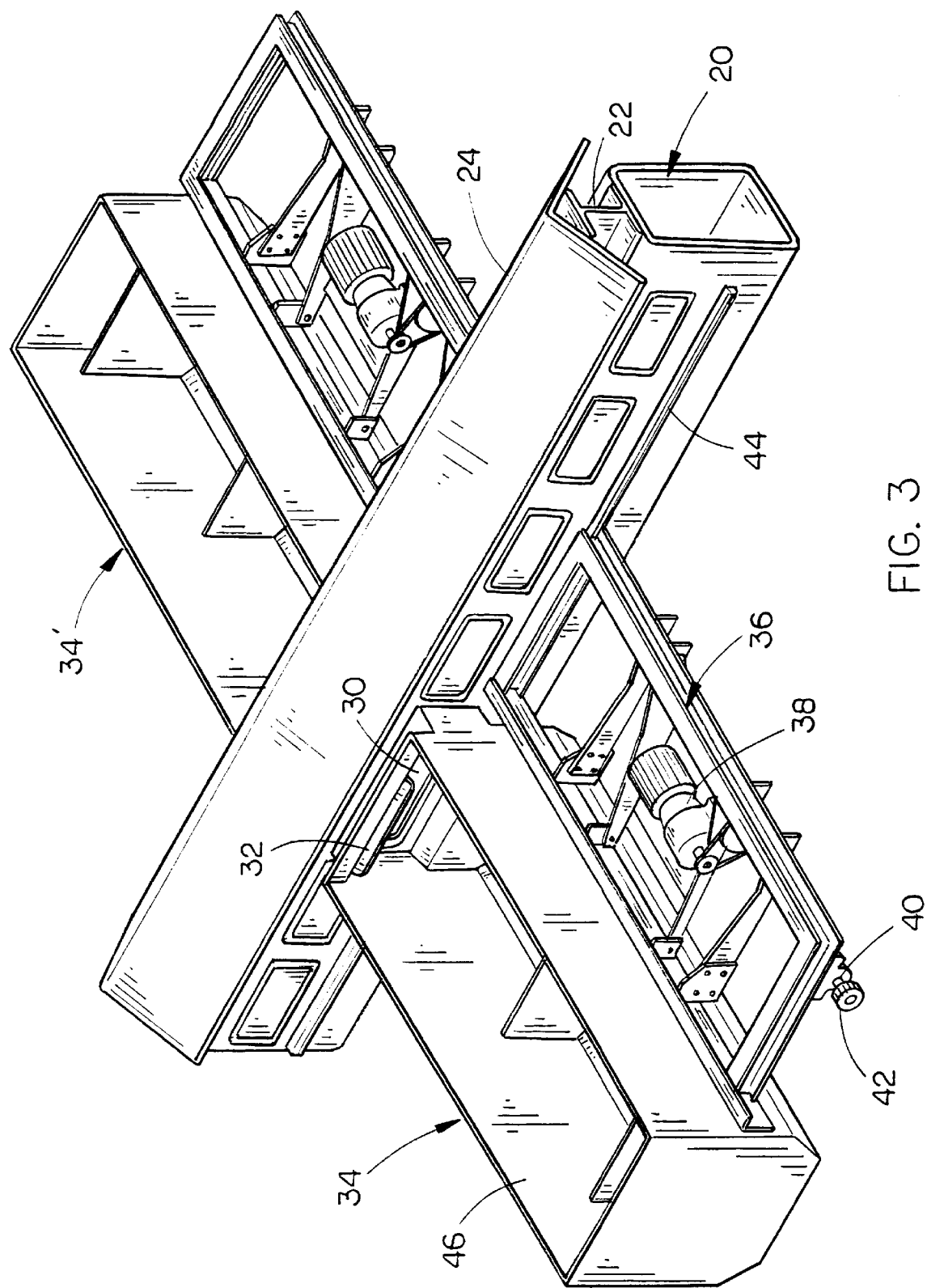
FIG. 3 is a partial perspective view of the exhaust system and slag removal system of this invention.

FIG. 3 illustrates one form of the slag collection apparatus which is preferably associated with the downdraft exhaust cutting table of this invention. A slag collection device 34 is positioned at one side of duct 20 while a slag collection device 34' is positioned at the other side of the duct 20. Inasmuch as slag collection devices 34 and 34' are identical, only slag collection device 34 will be described in detail with "'" indicating identical structure on slag collection device 34'.

Slag collection device 34 is positioned at one side of duct 20, as previously described, and includes a frame 36 which is movably positioned at one side of the duct 20 by any convenient means such as by drive motor 38 driving a shaft 40 which has a gear 42 at its outer end which is enmesh with gear rack 44 positioned at the inside surface of panel 18 and which runs the length thereof. A removable slag bucket 46 is supported upon the frame 36 and is designed to be positioned beneath the cutting torch assembly so that slag will fall downwardly from the cutting table into the collection bucket 46. As seen in FIG. 3, the inner end of slag collection bucket 46 is in communication with one of the openings 30 and that the damper 32 has been moved to its open position. The upper ends of the slag collection bucket 46 are positioned closely beneath the cutting table grid to create a ventilation zone beneath the cutting torch assembly so that the smoke and fume-laden air created by the cutting torch assembly will be drawn downwardly into the interior of the slag collection bucket 46 and into the interior of the duct 20 through the associated opening 30. The interior of exhaust duct 20 is in communication with an exhaust fan so that the smoke and fume-laden air within the exhaust duct will be drawn therefrom. As the slag collection apparatus 34 is moved along the length of the cutting table beneath the cutting torch assembly, successive dampers 32 will be opened and closed. The dampers 32 may be opened and closed by an actuator at the inner end of the slag collection bucket 46, by a hydraulic cylinder, or any other suitable means to ensure that the proper damper 32 will be opened to achieve the maximum downdraft exhaust of the smoke and fume-laden air. Although the drawings illustrate a slag collection device at opposite sides of the exhaust duct, the system could comprise a single movable slag collection device positioned at one side of the exhaust duct.

Figure 6:
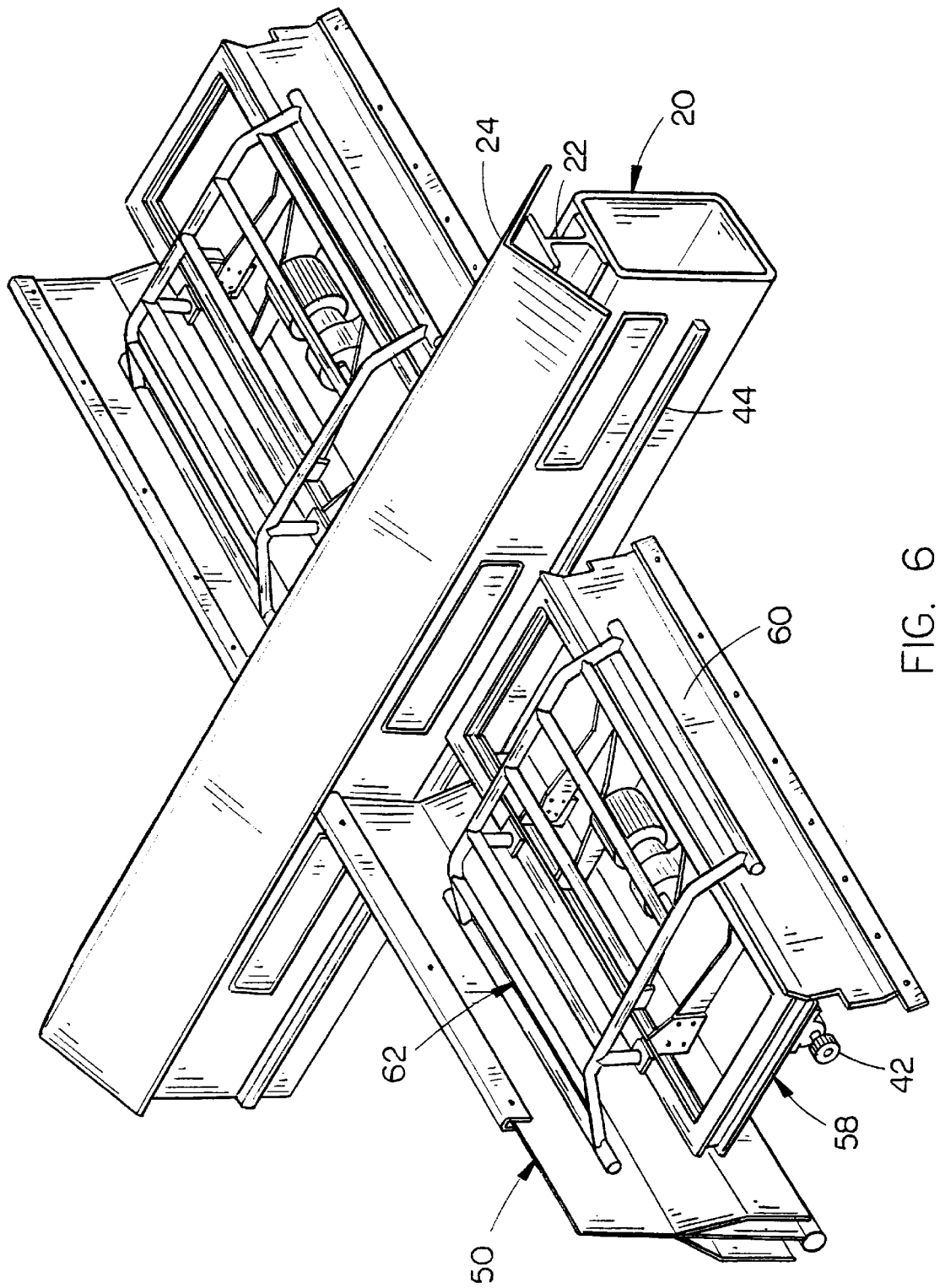
FIG. 6 is a perspective view of a modified form of the invention.
Figure 7:
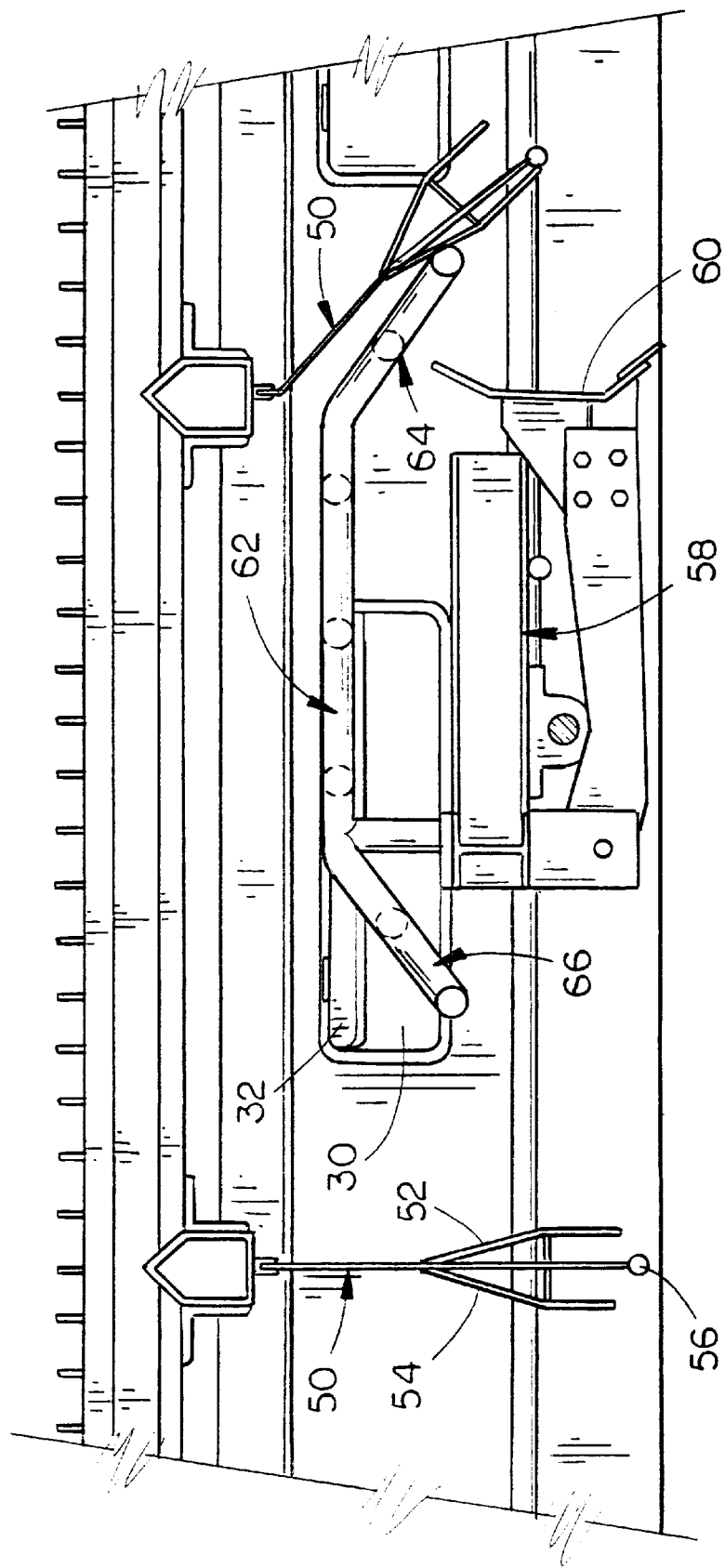
FIG. 7 is a side elevational view of the apparatus of FIG. 6.

In those installations where the slag collection devices 34 and 34' are to be replaced with a slag scraper/slag removal apparatus, such as illustrated in FIG. 6, the exhaust duct 20 will be modified somewhat as will now be explained and as illustrated in FIGS. 6 and 7. As seen in FIG. 6, a plurality of pivotal gates 50 extend outwardly from the sides of the exhaust duct 20 in a spaced-apart relationship. The upper ends of the gates 50 are pivotally secured by any convenient means to the supports 26. The gates 50 normally are positioned in the position illustrated in FIG. 6, but may be pivotally moved to the deflected or open position illustrated in the right portion of FIG. 7. Each of the gates 50 is provided with a pair of deflector plates 52 and 54 provided at the opposite lower ends thereof, as well as a cylindrical bar 56 positioned at the lower end thereof.

The slag removal device utilized with the structure of FIGS. 6 and 7 comprises a movable frame 58 which is moved along the length of the duct 20 beneath the cutting table, much like the slag collection device illustrated in FIG. 3. The slag removal device 58 includes a blade 60 at its forward end which is designed to engage and push the slag accumulating on the floor beneath the cutting torch assembly along the length of the cutting table to the end of the cutting table so that it may be conveniently collected. In order for the slag removal device 58 to pass through the gates 50, a framework 62 is provided at the upper end thereof and which has a forwardly and downwardly extending portion 64 at its forward end and a downwardly and rearwardly extending portion 66 at its other end. The downwardly and forwardly extending portion 64 is adapted to engage a gate 50, as illustrated in FIG. 7, to open the same to permit the slag removal device 58 to pass therethrough. The downwardly and rearwardly extending portion 66 is designed to engage and pivotally move a gate 50 when it is desired to move the slag removal device 58 to the forward end of the cutting table.

The gates 50 essentially form a series of ventilation zones so that smoke and fume-laden air from the cutting table may be drawn downwardly between the gates and into one of the openings 30. As previously described, means is provided for opening the dampers 32 in response to the position of the cutting torch and the slagger or slag removal device.

Thus it can be seen that a novel downdraft exhaust cutting table has been provided which creates ventilation zones which are successively opened when the cutting torch assembly is positioned thereabove to ensure that polluted air created by the cutting torch assembly is exhausted downwardly into the exhaust duct. Not only has a novel downdraft exhaust system been described, but a downdraft exhaust system has been described and illustrated which may be utilized with a slag collection device or a slag removal device.

Thus it can be seen that the invention accomplishes at least all of its stated objectives.

What is claimed is:

1. A downdraft exhaust cutting table, comprising:

an elongated, horizontally disposed, cutting table having opposite ends and opposite sides;

a cutting torch assembly positioned over said cutting table and being movable along the length thereof to cut material positioned on said cutting table;

an elongated exhaust duct positioned beneath said cutting table running parallel to the length of said cutting table;

said exhaust duct having a plurality of horizontally spaced-apart exhaust openings formed therein;

said cutting table being divided into first and second cutting zones running parallel to the length of said cutting table, with said exhaust duct positioned between said first and second cutting zones;

means for exhausting air from within said exhaust duct;

a normally closed movable damper adjacent each of said openings and being movable between open and closed positions;

each of said movable dampers, when in its said open position, permitting the passage of fume laden air and smoke therethrough into said exhaust duct;

and means for opening one or more dampers below said cutting torch assembly so that fume laden air and smoke from the vicinity of said cutting table will be drawn into said exhaust duct and exhausted therefrom.

2. A downdraft exhaust cutting table, comprising:

an elongated, horizontally disposed, cutting table having opposite ends and opposite sides;

a cutting torch assembly positioned over said cutting table and being movable along the length thereof to cut material positioned on said cutting table;

an elongated exhaust duct positioned beneath said cutting table running parallel to the length of said cutting table;

said exhaust duct having a plurality of horizontally spaced-apart exhaust openings formed therein;

means for exhausting air from within said exhaust duct;

a normally closed movable damper adjacent each of said openings and being movable between open and closed positions;

each of said movable dampers, when in its said open position, permitting the passage of fume laden air and smoke therethrough into said exhaust duct;

means for opening one or more dampers below said cutting torch assembly so that fume laden air and smoke from the vicinity of said cutting table will be drawn into said exhaust duct and exhausted therefrom;

a slag collector positioned beneath said cutting table below said cutting torch assembly for collecting slag which is created by the material being cut and which falls downwardly from said cutting table;

said slag collector being selectively movable along the length of said cutting table;

said means for opening said dampers including an actuator on said slag collector which engages said damper to open the same when said slag collector is positioned adjacent the damper.

3. The apparatus of claim 1 wherein said exhaust duct has a first side wall directed towards said first cutting zone and wherein said exhaust duct has a second side wall directed towards said second cutting zone; each of said first and second side walls having said horizontally spaced-apart exhaust openings formed therein which are closed by said dampers.

4. The apparatus of claim 3 wherein a slag collector is positioned beneath each of said first and second cutting zones for collecting slag which is created by the material being cut and which falls downwardly from said cutting table.

5. The apparatus of claim 4 wherein said slag collectors are selectively movable along the length of said cutting table.

6. The apparatus of claim 5 wherein said means for opening said dampers includes an actuator on each of said slag collectors which engages said dampers to open the same when said slag collectors are positioned adjacent said dampers.

7. A downdraft exhaust cutting table, comprising:

an elongated, horizontally disposed, flame cutting table having opposite ends and opposite sides;

a cutting torch assembly positioned over said cutting table and being movable along the length thereof to cut material positioned on said cutting table;

an elongated exhaust duct positioned beneath said cutting table running parallel to the length of said cutting table;

said exhaust duct having a plurality of horizontally spaced-apart exhaust openings formed therein;

means for exhausting air from within said exhaust duct;

a normally closed movable damper adjacent each of said openings and being movable between open and closed positions;

each of said movable dampers, when in its said open position, permitting the passage of fume laden air and smoke therethrough into said exhaust duct;

means for opening one or more dampers below said cutting torch assembly so that fume laden air and smoke from the vicinity of said cutting table will be drawn into said exhaust duct and exhausted therefrom;

a plurality of vertically disposed and horizontally spaced gates extending laterally from said duct to one side of said cutting table beneath said cutting table to define a plurality of ventilation zones;

and a slag removal device movably positioned beneath said cutting table at one side of said exhaust duct for removing slag which is created by the material being cut and which falls downwardly from said cutting table;

said gates being movably mounted whereby said slag removal device may pass therethrough.

8. The apparatus of claim 7 wherein said slag removal device comprises a push blade assembly for pushing the slag towards one end of the cutting table.

9. The apparatus of claim 8 wherein said slag removal device is selectively movable along the length of said cutting table.

10. The apparatus of claim 8 wherein each of said gates has an upper end and a lower end, each of said gates being pivotally mounted at its upper end whereby said gate may pivotally move about its upper end to permit said push blade assembly to pass therethrough.

11. The apparatus of claim 10 wherein each of said push blade assemblies has means thereon which engages the said gates to pivotally move the gates as said push blade assembly moves thereby.

12. The apparatus of claim 11 wherein said means on said gates comprises a frame means.

13. The apparatus of claim 12 wherein said frame means has an inclined forward end and an inclined rearward end.

* * * * *